J. Ells
Revolver
No. 652. Reissued Feb. 1. 1859.
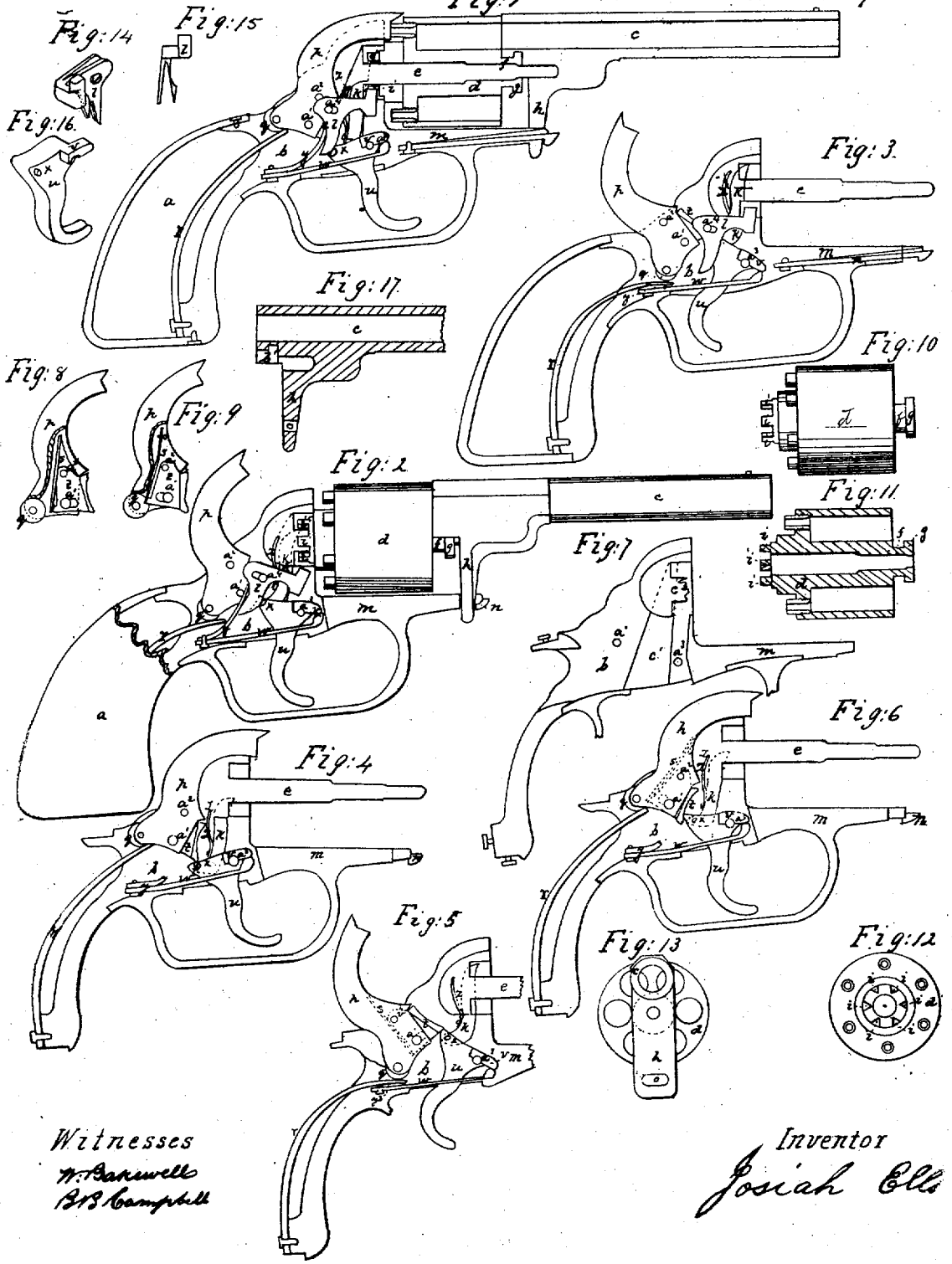
Witnesses
W. Barwell
B. B. Campbell
Inventor
Josiah Ells

UNITED STATES PATENT OFFICE.

JOSIAH ELLS, OF PITTSBURG, PENNSYLVANIA.

IMPROVEMENT IN REVOLVING FIRE-ARMS.

Specification forming part of Letters Patent No. 10,812, dated April 25, 1854; Reissue No. 652, dated February 1, 1859.

*To all whom it may concern:*

Be it known that I, JOSIAH ELLS, of Pittsburg, in the county of Allegheny, State of Pennsylvania, have invented certain new and useful improvements in revolving-breech fire-arms, applicable to guns, rifles, and pistols; and I do hereby declare that the following is a full, clear, and exact description thereof, reference being had to the annexed drawings, forming part of this specification, in which—

Figure 1 is a sectional side view of a pistol constructed with my improvements, a portion of the lock-plate being removed to exhibit the parts composing the lock, which are shown in their position before the pistol is cocked or fired. Fig. 2 is a side view of the pistol, showing the outside of the barrel and breech, and exhibiting the parts of the lock in their position when the trigger is pulled half-way back. Fig. 3 is a sectional view of the lock-frame and exhibits the several parts of the lock in their position when the trigger is fully drawn back. Figs. 4, 5, and 6 are side views of the lock-frame, showing the several parts of the lock, excepting the spring-bolt *l*, which is removed to exhibit the other parts more clearly. In Fig. 4 the parts of the lock are in a state of rest before firing. In Fig. 5 the hammer is raised by the trigger to full-cock and is on the point of firing. In Fig. 6 the hammer has fallen to fire the pistol and the trigger is in the act of regaining its position for the purpose of repeating the fire. Fig. 7 represents the lock-frame with all the parts of the lock removed, showing the position of the recess in which the finger *k* works. Fig. 8 represents the hammer, a part of which is removed to exhibit its vibrating tooth; and Fig. 9 is similar to Fig. 8, excepting that the vibrating tooth is pressed back. Figs. 10, 11, 12, and 13 represent the revolving breech. Fig. 10 is a side view; Fig. 11, a longitudinal section through its axis. Fig. 12 is a view of the back end; and Fig. 13 is a view of the front end, showing how much of the face of the breech is covered by the barrel. Fig. 14 is a perspective view of the spring-bolt, and Fig. 15 is a plane side view of the same. Fig. 16 is a perspective view of the trigger, designed to show more clearly the shoulder on which its spring rests and the stud by which the spring-bolt is operated. Fig. 17 is a sectional view of the breech and of the barrel, designed to exhibit the shape and position of the recess which receives the tubular extension and collar of the breech.

The similar parts of the pistol are in the several figures referred to by the same letters.

My invention consists in certain improvements in that class of fire-arms which are furnished with a revolving many-chambered breech, which may be summarily stated as follows: so constructing and arranging the parts of the lock that by drawing back the trigger used in firing the piece the hammer is not only raised to full-cock, but will stand in that position, being sustained by the pressure of the trigger against the hammer so as to neutralize and overcome the pressure of the mainspring, which would otherwise cause it to fall, and in such a manner that the piece may either be allowed to stand at cock or be fired at pleasure, the breech being rotated so far as to bring one of the chambers of the breech in a line with the bore of the barrel and locked in that position until the hammer has fallen; also, in the use of a tubular extension in front of the rotating breech, extending beyond and underneath the breech end of the stationary barrel, through which tubular extension the spindle passes and into which it fits closely for the protection of the spindle from fouling by the residuum of the smoke in firing; and in the use of a collar at the end of the tubular extension fitting into a recess in the stationary barrel, for the purpose of connecting the breech and barrel and sustaining the recoil of the breech; also, in making that part of the spindle which enters the breech of two diameters, in combination with a correspondingly-shaped bore in the revolving breech to aid in preventing the fouling of the spindle and in sustaining the recoil of the breech; also, in the use of a bracket and spring extending in front of the lock-plate for the purpose of connecting and locking the barrel and breech to the stock.

In the several drawings, *a* is the lock of the pistol. *b* is the lock-plate, which is made in the usual manner. *c* is the barrel. *d* is the revolving chambered breech. From the lock-plate *b* extends (in a suitable position and parallel to the axis of the barrel) the spindle *e*, which, passing through the rotating breech *d*, extends, if desired, (though this is not necessary,) into the bracket *h* of the barrel. The rotating breech, so far as relates to the position and shape of the chambers to receive the charges and of the nipples for the percussion-caps, is of the usual form of that part of repeating fire-arms, but differs from the ordinary construction in the following particulars: On the fore end of the breech I make a short cylinder or tubular extension, *t*, which, when the breech is in place, extends forward beyond and underneath the breech end of the stationary barrel *c*. The spindle *e*, as before stated, passes through the axial bore of the revolving breech *d*, and, extending also through and fitting in the tubular extension, passes into the bracket *h* of the stationary barrel *c*. The breech end of the stationary barrel *c*, passing over the tubular extension *t*, fits closely against the fore end of the revolving breech *d*, so that the axis of the bore of the barrel *c* coincides with the axis of each of the chambers in turn as the breech is rotated. The object of this arrangement is to prevent the fouling of the spindle by the residuum of the smoke after firing, caused by the passage of the smoke into the bore of the revolving breech and around the spindle, which is a great impediment to the action of the rotating breech, which ought to move smoothly and freely, and makes it necessary for the spindle and bore of the breech, as ordinarily constructed, to be frequently cleaned. This tubular extension (either with or without the collar *g*, hereinafter described) effectually prevents this fouling by covering over the spindle at the junction of the end of the chambers in the revolving breech and the stationary barrel. At the forward extremity of the tubular extension *t* is a circular collar or flange, *g*, which further aids in preventing the fouling of the spindle by deflecting the smoke, should it reach so far. This collar *g* is, however, principally designed to form a locking connection of the rotating breech with the stationary barrel, and also to sustain or prevent the recoil of the barrel at time of the discharge.

In the bracket *h* of the stationary barrel *c* is a recess, *b'*, of the exact shape to receive the upper half of the tubular extension *t* and collar *g*. Into this recess the tubular extension *t* and collar *g* fit closely, and the end of the spindle *e*, passing through the tubular extension, enters the bracket *h* of the barrel *c*, and thus a locking connection is formed between the revolving breech and stationary barrel, keeping those parts in place, and yet permitting the free rotation of the breech. (See Fig. 17, where the breech end of the barrel is shown in section to exhibit the position and shape of the recess *b'* and the hole for the entrance of the end of the spindle *e*.)

The spindle *e*, which carries the revolving breech, is not made of uniform diameter throughout; but that portion of it which enters the revolving breech is made of two or more different diameters, forming one, two, or more steps at different points within the breech, the diameter being uniform between these steps. (See Fig. 3.) The rotating breech *d* has a bore of exactly corresponding shape, the bore decreasing in diameter at different points in its length, so as to fit exactly on its spindle. It is manifest that when the rotating breech *d* is in place on its spindle *e* it cannot be forced farther back, and therefore when the pistol is fired the recoil of the breech will be sustained, or, rather, any actual recoil prevented, the breech being completely sustained by the spindle; but the main object and design of this arrangement is to prevent the passage of the residuum of the powder, after firing, from penetrating between the spindle and the inside of the bore of the breech and fouling the spindle, so that even without the tubular extension and collar the spindle constructed as I have described would to that extent answer a similar purpose. The form and construction of the rotating breech will be seen more clearly by reference to Figs. 10, 11, and 12.

At the upper extremity of the rotating breech are ratchets *i i*, &c., equal in number with the number of chambers in the breech, situate at equal distances apart, with a space between each. These ratchets enter a recess in the lock-plate around the spindle *e*, and it is against them that the finger *k* works to rotate the breech, and between them the head of the spring-bolt *l* passes to secure the rotating breech in its position during the discharge of the pistol, as hereinafter described. Immediately beyond the recess in the barrel is the bracket *h*, which extends down at right angles to the barrel as far as the extension *m* of the lock-plate. This extension of the lock-plate projects just so far that its extremity passes through a small hole in the bracket of the barrel.

In a recess or groove in the under side of the extension *m* is a spring, *n*, with a head at its extremity which projects beyond the extension *m* far enough to catch on the outer side of the hole *o* in the lower part of the bracket *h* of the barrel, (see Figs. 13 and 17,) and thus securely attach the barrel and rotating breech to the lock-frame. This arrangement secures the speedy attachment and removal of the barrel and breech, it being only necessary to grasp the barrel in the hand and with the thumb press the head of the spring *n*, when, by pulling the barrel from the stock, a separation at once ensues.

It now remains to explain the construction and operation of the several parts of the lock of the pistol, which are shown in a state of rest in Fig. 1, in which *p* is the hammer, which turns on the hammer-pin *a'*. At the heel of the hammer is a friction wheel or roller, *q*, against which presses the end of the mainspring *r*. The mainspring *r* is attached to the lower extremity of the lock-plate, passing up through the hollow part of the stock of the pistol. The mainspring *r* is designed to force the hammer, after it is released from the trigger, down against the nipple of the breech to explode the percussion-cap. The hammer is represented in Fig. 1 as lying in its recess in the upper part of the lock-plate, the space between the dotted lines and the under side of the hammer showing the depth of the recess, its width being such as just to permit of the easy play of the hammer. In the lower part of the hammer and extending nearly to its heel is a slit to receive a vibrating tooth, *t*. (See Figs. 8 and 9.) This vibrating tooth is hung in the hammer on the hinge-pin $a^2$, and a slot in the lower part of the tooth, through which the hammer-pin $a'$ passes, prevents the hammer-pin interfering with its action. The length of the slot also determines the extent to which the vibrating tooth projects from the hammer. One end of the slot, pressing against the hammer-pin $a'$, sustains the pressure of the trigger when the hammer is being raised, as will be more clearly seen hereinafter. In the slit in the hammer and behind the vibrating tooth *t* is a slight spring, *s*, which presses the vibrating tooth *t* forward whenever it is released from the back-stroke of the trigger.

The trigger *u*, of the shape shown in Fig. 16, is hung on the trigger-pin $a^3$. Immediately in front of this pin $a^3$ is a shoulder, *v*, on which rests the point of the spring *w*, which is placed in and secured to the lock-plate, as shown in the several Figs. 1 to 6. This trigger-spring *w* enables the trigger to recover its position after being pulled back. The position of the point of the trigger before firing in relation to the hammer and vibrating tooth is shown clearly in Fig. 4. The toe of the vibrating tooth rests on the trigger, near its point. As the trigger is drawn back its point, pressing against the extremity of the vibrating tooth, raises the hammer to full-cock, (see Fig. 5,) which presses down the mainspring *v*. When in this position (shown in Fig. 5) the slightest touch on the trigger causes its point to pass the extremity of the toe of the vibrating tooth *t*, and the hammer immediately descends, striking forcibly against the cap on the nipple of the rotating breech and firing the pistol. So soon as the pressure of a person's finger is removed from the trigger the spring *w* causes it to recover its first position. In doing this it must pass on its back-stroke the end of the vibrating tooth, which yields to the pressure of the point of the trigger, as shown in Fig. 6, the vibrating tooth receding, as shown in Fig. 9, and the trigger, regaining its first position, is ready for repeating the operation of firing. The arrangement of the position of the hammer-pin $a'$, the trigger-pin $a^3$, and the hinge-pin $a^2$ of the vibrating tooth is such as to be peculiarly adapted to produce ease in firing, and also enables the hammer *p* to stand at full-cock if the trigger *u* be carefully drawn back to the position shown in Fig. 5—that is, not quite far enough to pass the end of the vibrating tooth *t* in the toe of the hammer. In repeating firearms as ordinarily constructed the mainspring is so arranged that the greatest amount of force is required in raising the hammer as it approaches the point of full-cock, and when it is descending, the spring acts against it in such a manner that its greatest force is at the beginning of the downward stroke, its force gradually diminishing as it approaches the breech. The reverse of this should be the case, and I have attained this object by my arrangement. As the hammer rises the point of bearing of the mainspring on the heel of the hammer is brought gradually more into a perpendicular line with the center or turning point of the hammer, while the effective power or leverage of the trigger to overcome the pressure of the spring is gradually diminished, and at the point of full-cock the center-pin $a'$ of the hammer and the point of pressure of the spring are brought almost in a perpendicular line. It is evident that if the point of pressure *q* of the spring were brought immediately under the center-pin $a^2$ of the hammer the hammer would have no tendency to fall, and the nearer it approaches that point the less force is required to overcome the pressure of the mainspring. So, also, as the hammer falls the effective leverage of the mainspring increases, and the hammer has its greatest force when it reaches the percussion-cap on the breech. The result of this arrangement is that the hammer may be raised to full-cock and there allowed to stand, and the trigger be held in a drawn position ready to be fired by a slight touch, because although the force of the mainspring on the heel of the hammer is not entirely neutralized by bringing the point *q* directly under the hammer-pin $a^2$, yet the slight remaining pressure is sustained and held *in equilibrio* by the pressure of the point of the trigger *u* against the toe of the hammer when the parts are in the position shown in Fig. 5.

Where the pistol has been fired and the trigger and other parts have resumed their first position, it is necessary that in raising the hammer again by pulling the trigger the breech should be turned so far as to bring the next loaded chamber in a line with the barrel. This rotation of the breech is effected by the finger *k*, which is connected with the trigger by a pin projecting from its side at the lower extremity and which enters into a corresponding circular hole in the side of the trigger, near its point, immediately opposite the stud *x*. The finger *k* lies in the recess $c'$ in one side of the lock-plate shown in Fig. 7, and a spring, *z*, on the back of the finger *k* presses against the wall of the recess and keeps the finger pressed forward. This recess extends (see dotted lines in Fig. 7) so far as to open into and connect with the circular recess around the spindle *e*, into which the ratchets *i i*, &c., on the rotating breech enter. When the trigger is in the position shown in Figs. 1 and 4 the finger *k* does not at all interfere with the ratchets, but in rising to the position shown in Fig. 5 it enters the recess around the spindle, and, coming in contact with one of the ratchets *i*, causes the rotation of the breech, and on attaining the point at which the pistol is at full-cock it has turned the breech so far as to bring another chamber into exact coincidence with the bore of the barrel, in which position it is retained in the manner hereinafter set forth until the pistol is fired, after which the trigger returns to its first position and withdraws the finger *k* from contact with the ratchets. The spring-bolt (see Figs. 14 and 15) is designed to lock the rotating breech in its proper position during firing, and is so constructed and arranged as to release the breech and allow of its rotating so soon as the finger *k* comes in contact with one of the ratchets *i*. In Fig. 14 that side of the spring-bolt *l* is turned toward the eye which is concealed from view in Figs. 1, 2, and 3. This spring-bolt *l* is attached to the lock-plate by a pin, $a^4$, (see Fig. 1,) which passes through the slot or pin-hole in the side of the bolt, (seen in Fig. 14.) The center part of this bolt is composed of two leaves or springs, one of which, nearest to the eye in Fig. 1, rests against one side of the lock-plate, and one edge of the other leaf rests against the stud *x* on the point of the trigger. (See Fig. 1.) As the trigger is drawn back its point rises and the stud *x*, still pressing against the edge of the inner leaf of the spring-bolt *l*, turns it on its center-pin $a^4$ so far as to release the head of the bolt from the position which it occupies in Fig. 1, where it is represented as entering into the recess around the spindle *e* and passing between two of the ratchets *i i* on the neck of the rotating breech, thus locking it in its place. The position then assumed by the head of the spring-bolt *l* is shown in Fig. 2, where it is drawn back, so as to release the ratchet and allow the breech to rotate. In Fig. 2 it will be seen that just as the head of the spring-bolt is cleared from the ratchet the finger *k* is coming in contact with the ratchet *i'* in the circular recess around the spindle.

Until the finger *k* has risen so far as to turn the rotating breech the stud *x* retains its position on the edge of the leaf of the spring against which it rests; but so soon as the breech is rotated the stud *x* reaches a point on the edge of the leaf of the spring where the edge of the leaf is beveled or chamfered, (see Figs. 14 and 15 and the dotted lines on the spring-bolt in Fig. 2,) where it is so thin that the stud *x* slips over onto the side of the leaf of the spring and passes round the projection. (See Fig. 14.) The spring *y*, pressing on the back of the spring-bolt *l*, forces it up to its place and again locks the rotating breech before the trigger has risen far enough to release the hammer and fire the pistol. The trigger then falls back to its first position, and when it is so doing the stud *x* passes over the side of the leaf of the spring, which yields sidewise to allow it to pass without disturbing its position or withdrawing it from its locking connection with the ratchets *i i*, and when the trigger has entirely recovered its first position the stud *x* passes off from the side of the leaf of the spring and resumes its position on the edge.

It is manifest that the pistol may be loaded without removing the rotating breech or barrel, for by a slight pull of the trigger the spring-bolt *l* may be unlocked from the ratchet, and the breech can then be freely turned (when the parts are in the position shown in Fig. 3) by hand and the chambers in the breech successively loaded, as will be seen by Fig. 13, where in a breech of six chambers, two of them (one on each side of the barrel) are entirely clear, and may be charged without difficulty and the breech turned round till all are loaded.

I disclaim originality in the combining of a rotating chambered breech with a barrel and lock, excepting in the particular manner set forth. Neither do I claim the use of the recoil-shield as such, the collar on the tubular extension, or, if the collar is not used, the spindle of the shape hereinbefore described, sustaining or preventing the actual recoil of the breech. I also disclaim originality in the use of the vibrating tooth and spring in the hammer.

I do not claim the use of the vibrating tooth and spring in the hammer. Neither do I claim the use of a revolving chambered breech, in combination with a barrel and lock, excepting in the manner described; but What I do claim as my invention, and desire to secure by Letters Patent, is—

1. The combination of a revolving breech and stationary barrel with a lock so constructed as that the trigger used to fire the pistol when drawn back raises the hammer to full-cock and there holds it, the revolving breech being at the same time rotated so far as to bring one of the chambers in a direct line with the bore of the barrel and fastened in that position preparatory to firing the piece, substantially in the manner described.

2. The peculiar arrangement of the parts of my lock hereinbefore described, whereby as the the trigger is drawn back to raise the hammer the heel of the hammer, or the point against which the mainspring bears, is brought so nearly under the center of motion of the hammer that the force of the mainspring is counterbalanced by the pressure of the trigger on the toe of the hammer, and thus it will stand at full-cock or may be fired at once, as may be desired.

3. The use of a tubular extension on the fore part of the rotating breech, extending beyond and underneath the breech end of the stationary barrel, through which tubular extension the end of the spindle projects, and into which the spindle fits closely, for the purpose of preventing the fouling of the spindle by the residuum of the smoke in firing.

4. The use of a collar at the end of the tubular extension for the purpose of forming, in combination with the spindle, a locking connection between the revolving breech and the stationary barrel, which is furnished with a corresponding recess for the reception of the collar, as hereinbefore set forth.

5. Forming that part of the spindle which enters the bore of the rotating breech of smaller diameter at the front extremity than at the end nearest the lock, not by making it uniformly tapering, but by reducing its diameter suddenly, so as to form a step or shoulder at one or more points within the rotating breech, in combination with the rotating breech having a bore of correspondingly-diminished diameter, for the double purpose of sustaining the recoil of the breech in firing and of aiding to prevent the fouling of the spindle by presenting an obstruction to the passage of the smoke between the spindle and the surface of the bore of the rotating breech.

6. The connecting and locking the barrel and breech to the lock-plate by means of a bracket and spring extending in front of the lock-plate, in the manner described.

JOSIAH ELLS.

Witnesses:
W. DUDLEY KING,
W. BAUEWELL.